US012620395B2

(12) United States Patent
Carbune et al.

(10) Patent No.: US 12,620,395 B2
(45) Date of Patent: May 5, 2026

(54) GENERATING A GROUP AUTOMATED ASSISTANT SESSION TO PROVIDE CONTENT TO A PLURALITY OF USERS VIA HEADPHONES

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 229 days.

(21) Appl. No.: 18/075,155

(22) Filed: Dec. 5, 2022

(65) Prior Publication Data

US 2024/0185848 A1    Jun. 6, 2024

(51) Int. Cl.
*G10L 15/22* (2006.01)

(52) U.S. Cl.
CPC ........ *G10L 15/22* (2013.01); *G10L 2015/223* (2013.01); *G10L 2015/225* (2013.01); *G10L 2015/228* (2013.01)

(58) Field of Classification Search
CPC .............. G10L 15/22; G10L 2015/223; G10L 2015/225; G10L 2015/228
See application file for complete search history.

(56) References Cited

U.S. PATENT DOCUMENTS

| | | | | |
|---|---|---|---|---|
| 10,031,722 | B1 * | 7/2018 | Mutagi | .................... G10L 15/02 |
| 11,283,846 | B2 * | 3/2022 | Broberg | ................ H04L 65/611 |
| 2015/0149182 | A1 * | 5/2015 | Kalns | ...................... G10L 15/18 |
| | | | | 704/275 |
| 2017/0345422 | A1 * | 11/2017 | Yang | ...................... G06F 3/167 |
| 2018/0233136 | A1 | 8/2018 | Torok | |

(Continued)

FOREIGN PATENT DOCUMENTS

WO          2020006410 A1      1/2020

OTHER PUBLICATIONS

Apple, "Use AirPods with iPhone—Apple Support", retrieved from Internet Archive, https://web.archive.org/web/20220106051015/ https://support.apple.com/guide/iphone/use-airpods-iph5dbdb05b9/ 15.0/ios/15.0, Jan. 6, 2022. (Year: 2022).*

(Continued)

*Primary Examiner* — Brian L Albertalli
(74) *Attorney, Agent, or Firm* — Gray Ice Higdon

(57)          ABSTRACT

Systems and methods for creating a group automated assistant session and processing requests that are intended for the users that are included in the group. A plurality of users can indicate intentions to create a group session that includes selecting an automated assistant, from the automated assistants executing on the devices of the user and providing the selected automated assistant with audio data that is captured by microphones of the user devices. In response, the selected automated assistant processes the audio data and generates a response that is provided, via one or more speakers of the device that is executing the selected automated assistant. Further, fulfillment data is provided to the automated assistants executing on other devices and, in response to being provided the fulfillment data, each automated assistant causes audio data to be rendered, via one or more speakers of each respective device, that is responsive to the request.

20 Claims, 5 Drawing Sheets

(56)          References Cited

U.S. PATENT DOCUMENTS

| | | | |
|---|---|---|---|
| 2019/0018644 A1 | 1/2019 | Kovacevic | |
| 2019/0164556 A1* | 5/2019 | Weber | G10L 15/34 |
| 2019/0189117 A1* | 6/2019 | Kumar | G06F 16/3329 |
| 2019/0279615 A1* | 9/2019 | Ben-Dor | H04L 41/0893 |
| 2020/0075022 A1* | 3/2020 | DeLuca | G10L 17/00 |
| 2020/0098373 A1* | 3/2020 | Fujita | G10L 15/30 |
| 2020/0126551 A1 | 4/2020 | Xiong | |
| 2020/0341804 A1* | 10/2020 | Rakshit | G06N 5/02 |
| 2020/0372909 A1* | 11/2020 | Albrecht | G10L 15/22 |
| 2021/0249018 A1* | 8/2021 | Shin | G10L 15/16 |
| 2021/0352122 A1 | 11/2021 | Broberg | |
| 2021/0366475 A1* | 11/2021 | Wilkosz | G06Q 50/26 |
| 2021/0407490 A1* | 12/2021 | Cardoso | G06N 3/045 |
| 2022/0083310 A1 | 3/2022 | Lynch | |
| 2023/0290348 A1* | 9/2023 | Rodriguez Bravo | H04M 3/565 |
| 2024/0146776 A1* | 5/2024 | Hansen | G10L 15/22 |
| 2024/0195851 A1* | 6/2024 | Phillips | G10L 15/22 |

OTHER PUBLICATIONS

European Patent Office; International Search Report and Written Opinion issued in Application No. PCT/US2022/052019; 15 pages; dated Jul. 25, 2023.

* cited by examiner

305

Receiving a first indication from a first user of intent to join a group session

310

Receiving a second indication from a second user of intent to join the group session

315

Selecting an automated assistant as the group automated assistant

320

Creating the group automated assistant session

Continued in FIG. 3B

GENERATING A GROUP AUTOMATED ASSISTANT SESSION TO PROVIDE CONTENT TO A PLURALITY OF USERS VIA HEADPHONES

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an explicit input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This explicit input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), audio data of a spoken utterance of a user (or a text conversion thereof), and optionally data indicative of the user's identity (e.g., credentials). The cloud-based counterpart may perform various processing on the explicit input to return result(s) to the automated assistant client, which may then provide corresponding output to the user. In other cases, automated assistants may be exclusively executed locally by assistant devices and that are engaged directly by users to reduce latency.

SUMMARY

Implementations disclosed herein relate to selecting an automated assistant to utilize in a group environment whereby each user in the group can interact within the same automated assistant session, via individual headphones, while the group session is active. A first client device, executing an automated assistant that is providing audio output via one or more external speakers (e.g., headphones), can determine that a user of a second device, which is also executing an automated assistant that can provide audio output via one or more other external speakers, intends on joining the automated assistant session of the first device (or create a new automated assistant session in conjunction with the first device). The group can be created and one of the automated assistants can be selected as the primary automated assistant, which can process requests that are received from either a user of the first device and/or a user of the second device while the session is active. While the session is active, audio data that is captured by microphones associated with the first device and audio data that is captured by microphones associated with the second device can both be processed by the primary automated assistant. When the captured audio data includes a request that is intended for the group, the primary automated assistant can process the request and provide a response that can be rendered by both the speakers associated with the first device and the speakers associated with the second device. In some implementations, the primary automated assistant can directly provide a response via the speakers of both devices. In some implementations, the primary automated assistant can provide fulfillment data to the secondary automated assistant (i.e., the automated assistant that was not selected as the primary automated assistant) for generating a response that can be rendered via the speakers associated with the device that is executing the secondary automated assistant.

For example, a user may be engaged with an automated assistant that is executing on a mobile device via headphones that allow the automated assistant to provide audio output to the user. The user may utter one or more requests that are captured by a microphone associated with the mobile device (e.g., a microphone of the mobile device and/or a microphone that is a component of the headphone(s)). In response, the automated assistant can process the utterance and cause one or more actions to be performed, such as rendering an audio response to a query via the headphones and/or cause one or more other applications to perform an action. For example, the user can utter "OK Assistant, play my playlist," which can be captured as audio data by one or more microphones of the user's device (or headphones). The request can be fulfilled by one or more components of the automated assistant. For example, the automated assistant can provide fulfillment data to a music player application, which can cause the user's playlist of music to be rendered via the headphones. Also, for example, the user can utter "OK Assistant, what is the weather forecast for tomorrow," and in response, the automated assistant executing on the user device can determine a response and audibly render the response via the headphones.

In some implementations, a user that is utilizing headphones can encounter another user that is utilizing headphones. For example, a second user can be in communication with a second automated assistant (either a second instance of the same automated assistant as the first user or a different automated assistant) that is executing on a second device, whereby the second automated assistant can provide audio content via headphones that are being utilized by the second user. In some instances, the users may intend to both communicate with each other as well as share in a session with one of the automated assistants such that both users can hear responses that are rendered by the automated assistant. Further, the users may have interest in allowing both users (or, in some cases, multiple users of a group) to provide requests that can be processed by one of the automated assistants and rendered to all members of the group.

In some implementations, a group session can be initiated based on one or more indications, either explicit or implicit, from the users, that indicate two or more users have interest in creating a group automated assistant session. For example, a user can utter "OK Assistant" while in proximity to another user such that automated assistants of both devices can process the utterance and determine that the utterance includes an invocation phrase that invokes both automated assistants. The users can additionally or alternatively select a mode that indicates an interest in creating a group automated assistant session. For example, each of the users can select a "group session" mode to indicate an interest in creating a group automated assistant session, and the session can be created when both automated assistants process audio data that includes the user uttering an invocation phrase. In some implementations, the group session can be created when a particular phrase is uttered and processed by multiple automated assistants. For example, an invocation phase of "OK Assistants, start a group session," processed by both automated assistants and subsequent to an indication of user interest in creating a group session, can create a group session. Other examples of user interest in creating a group session can include, for example, a user actuating a button, selecting an icon, and/or otherwise providing input while other users with interest in joining the group session perform the same action.

In some implementations, a user can join a group session that is already in progress. For example, a first user and a second user can create a group automated assistant session and a third user can move within proximity of the other users. In some implementations, the presence of the third user can be determined based on sensor data of the first and/or second device, and the third user can be prompted to join the session. Prompting the user can include, for example, providing a notification to the user via the device associated with the user (e.g., a visual notification, an audio alert) and the third user can join the session that is already in progress (confirm a notification, actuate a button, etc.).

In some implementations, users can be provided with an option to create a joint session when the users are located in the same area. For example, one or more components can monitor the location of users and when two or more users are within a threshold distance, a group session can be created. In some implementations, locations of user representations within a metaverse can be monitored and when user representations are within a threshold distance, a group session can be created. In some implementations, contact information of the users can be utilized to determine whether to create a group session. For example, if contact information indicates that two users have historically be co-located and/or have created past group sessions, the users may have more interest in creating a group session than, for example, two users that have met for the first time and/or have only been co-located for limited durations. Also, for example, if two users have a calendar entry that indicates they have a meeting in the same location, the users may have more interest in creating a group session than other users that are not part of a meeting indicated by a calendar entry.

Once one or more automated assistants have determined that users have an intent to create a group session, the automated assistants executing on the devices of the user can determine which automated assistant will process requests for the group. In some implementations, each user device (e.g., the user device to which a user's headpahones is paired) can be executing an automated assistant that handles requests for the individual (e.g., for requests that are not directed to group actions) but a different automated assistant (e.g., one of the automated assistants executing on the client devices) can be selected as a primary automated assistant to process the requests of all of the users of the group. Other automated assistants (e.g., the non-primary automated assistant(s)) can receive fulfillment data from the primary automated assistant to render content to the respective other users. For example, the automated assistant of a first user can be selected as the primary automated assistant and a request by the second user of "Play rock music for the group" can be processed by the automated assistant of the first user. In response, the automated assistant of the first user can provide a stream of audio (e.g., rock music) to the second automated assistant, which can cause the audio stream to be rendered by the headphones of the second user.

As another example, a first user can utter a request that is processed by the automated assistant executing on the device of the first user, such as "OK Assistant, tell the group the weather forecast for today." In response, the first automated assistant (the "primary automated assistant") can process the request and generate a response. The response can be provided, as text, to the automated assistants of the other users, which can perform text-to-speech conversion of the text to generate speech, which can be provided to the other users via headphones associated with each of the devices. Thus, the primary automated assistant can be utilized to generate fulfillment data, which can be rendered with the assistance of the automated assistants that are executing on the other devices.

In some implementations, a user that joins a group session that is already in progress can be provided with a summary of actions that occurred within the group before the user joined. For example, a group session can be created that includes a first user and a second user. During the group session, one or more queries can be provided to the group automated assistant, one or more actions can be performed by the automated assistant, dialog can occur between the users, and/or other events can occur that may be of interest to other users that are not a part of the group at the time. Indications of those events can be stored by one or more components of the primary automated assistant, and when a new user joins the group, the new user can be provided (e.g., audio content can be rendered via headphones) that indicates what events have previously occurred within the group. The summary can include, for example, audio playback of one or more interactions, an audibly rendered summary of events that occurred, re-performance of one or more actions, and/or other audio content that may be of interest to the user such that the user can better understand the context of the conversation of which the new user is now a part.

In some implementations, the user can end a session by providing an indication, via the client device of the user, indicating an intent to leave a group automated assistant session. For example, the user can disable a group session mode, press a button that is part of the client device and/or the headphones associated with the client device, and/or other explicit indication that the user intends to leave a group automated assistant session that is currently taking place. In some implementations, the user can change locations to a location that exceeds a threshold distance from other users of the group and the device of the user can be unassociated with the other devices of the group based on the user no longer being located within the proximity of the other users of the group. In some implementations, a user may be no longer associated with a group session if one or more other applications indicates that the user no longer has intent to be a part of the group session. For example, a group session may be associated with a calendar entry that is included in a calendar application of the users, and when the calendar entry expires (e.g., the current time is past the ending time of the calendar entry), the users of the group can be removed from the group.

In some implementations, a user may change groups based on one or more explicit and/or implicit indications of an intent to change groups. For example, a first group session may include users that are located in a first location and a second group session may include users that are located in a second location. One of the users of the first group may change positions to be closer (e.g., within a threshold distance from) the users of the second group. In response, the device of the user can be switched from the first group to the second group. Thus, a room can have multiple groups and the users can change groups based on movement and proximity of the users to each other.

In instances whereby a new user joins a group that is already in session, the group session can be reconfigured to reflect the new user. For example, when a new user joins a group, a different automated assistant can be selected as the primary automated assistant, one or more group parameters can be updated (e.g., a group name, a genre of music that is being played for the group), and/or one or more other events can occur, such as alerting the rest of the group of the newly joined user, providing a summary of previous group activity to the new user, and/or resetting contextual information to reflect that the group has changed in composition. Thus, in some instances, when a new user joins a session, the currently active session can be ended and a new group session created and/or the new user can be incorporated into the already existing group session.

Implementations described herein mitigate the need for users who are collaborating in a group session to individually submit requests that are intended for the group of users. For example, a user in a group environment may have a request that is related to the collaborative work and can submit the request to an automated assistant for a response. Another user may have the same request and may submit the same request to another automated assistant for a response. However, by providing responses to a group that is engaged in a group session, computing resources can be conserved by minimizing the number of requests that are submitted by the users by providing responses to requests on behalf of the group.

The above description is provided as an overview of some implementations of the present disclosure. Further description of those implementations, and other implementations, are described in more detail below.

DETAILED DESCRIPTION

Figure 1:
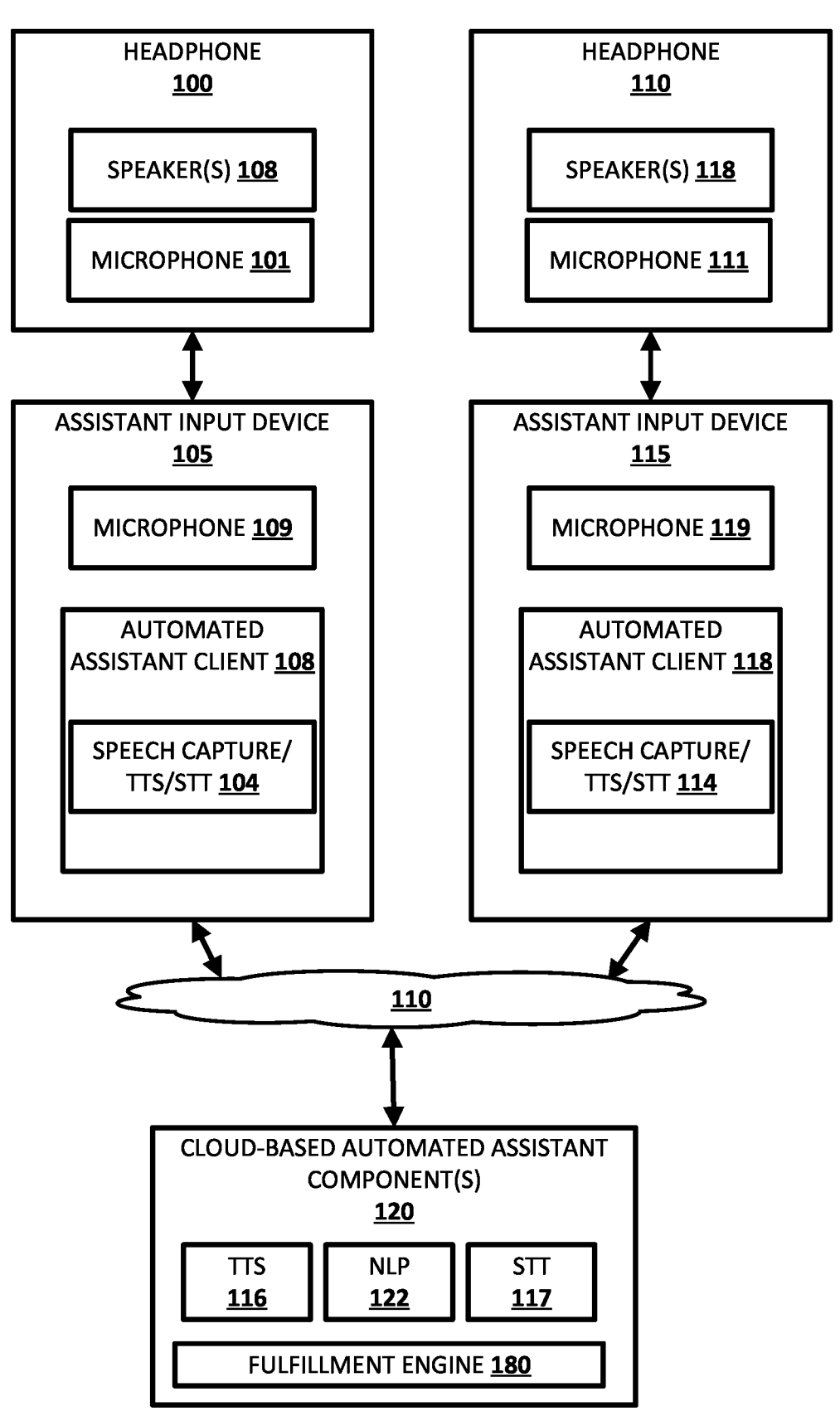
FIG. 1 is a block diagram of an example environment in which implementations disclosed herein may be implemented.

Turning now to FIG. 1, an example environment in which techniques disclosed herein may be implemented is illustrated. The example environment includes two assistant input devices 105 and 115 and one or more cloud-based automated assistant components 120. Assistant input devices 105 and 115 can execute a respective instance of a respective automated assistant client 108 and 118. However, in some implementations one or more of the assistant input devices 105 and 115 can optionally lack an instance of the respective automated assistant client 108 and 118, and still include engine(s) and hardware components for receiving and processing user input directed to an automated assistant (e.g., microphone(s) 101 and 111, speaker(s) 108 and 118, speech recognition engine(s), natural language processing engine(s), speech synthesis engine(s), and so on). An instance of the automated assistant client can be an application that is separate from an operating system of the respective assistant input devices 105 and 115 (e.g., installed "on top" of the operating system)—or can alternatively be implemented directly by the operating system of the respective assistant input devices 105 and 115. As described further below, each instance of the automated assistant client 108 and 118 can optionally interact with one or more cloud-based automated assistant components 120 in responding to various requests provided by respective user interface components of any one of the respective assistant input devices 105 and 115. Further, and as also described below, other engine(s) of the assistant input devices 105 and 115 can optionally interact with one or more of the cloud-based automated assistant components 120.

One or more the cloud-based automated assistant components 120 can be implemented on one or more computing systems (e.g., server(s) collectively referred to as a "cloud" or a "remote" computing system) that are communicatively coupled to respective assistant input devices 105 and/or 115 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 120 with the assistant input devices 105 and/or 115 is indicated generally by 110 of FIG. 1. Also, in some implementations, the assistant input devices 106 may be communicatively coupled with each other via one or more networks (e.g., LANs and/or WANs).

An instance of an automated assistant client 108 and/or 118, by way of its interactions with one or more of the cloud-based automated assistant components 120, may form what appears to be, from a user's perspective, a logical instance of an automated assistant with which the user may engage in a human-to-computer dialog. For example, a first automated assistant can be encompassed by a first automated assistant client 108 of a first assistant input device 105 and one or more cloud-based automated assistant components 120. A second automated assistant can be encompassed by a second automated assistant client 118 of a second assistant input device 115 and one or more cloud-based automated assistant components 120. The first automated assistant and the second automated assistant may also be referred to herein simply as "the automated assistant". It thus should be understood that each user that engages with an automated assistant client 108 and/or 118 executing on one or more of the assistant input devices 105 and/or 115 may, in effect, engage with his or her own logical instance of an automated assistant (or a logical instance of automated assistant that is shared amongst a household or other group of users and/or shared amongst multiple automated assistant clients). Although only two assistant input devices 105 and 115 are illustrated in FIG. 1, it is understood that cloud-based automated assistant component(s) 120 can additionally serve many additional groups of assistant input devices. Moreover, although various engines of the cloud-based automated assistant components 120 are described herein as being implemented separate from the automated assistant clients (e.g., at server(s)), it should be understood that it is for the sake of example and is not meant to be limiting. For instance, one or more (e.g., all) of the engines described with respect to the cloud-based automated assistant components 120 can be implemented locally by one or more of the assistant input devices 105 and/or 115.

The assistant input devices 105 and/or 115 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant. Additional and/or alternative assistant input devices may be provided. In some implementations, assistant input devices 105 and/or 115 can be associated with each other in various ways in order to facilitate performance of techniques described herein. For example, in some implementations, the assistant input devices 105 and 115 may be associated with each other by virtue of being communicatively coupled via one or more networks (e.g., via the network(s) 110 of FIG. 1). This may be the case, for instance, where the plurality of assistant input devices 106 are deployed across a particular area or environment, such as a home, a building, and so forth. Additionally, or alternatively, in some implementations, assistant input devices 105 and 115 may be associated with each other by virtue of them being members of a coordinated ecosystem that are at least selectively accessible by one or more users (e.g., an individual, a family, employees of an organization, other predefined groups, etc.). In some of those implementations, the ecosystem of the assistant input devices 105 and 115 can be manually and/or automatically associated with each other in a device topology representation of the ecosystem.

Additionally, or alternatively, in some implementations, one or more of the assistant input devices 105 and/or 115 may perform speaker recognition to recognize a user from their voice. For example, some instances of the automated assistant may be configured to match a voice to a user's profile, e.g., for purposes of providing/restricting access to various resources. Various techniques for user identification and/or authorization for automated assistants have been utilized. For example, in identifying a user, some automated assistants utilize text-dependent techniques (TD) that is constrained to invocation phrase(s) for the assistant (e.g., "OK Assistant" and/or "Hey Assistant"). With such techniques, an enrollment procedure is performed in which the user is explicitly prompted to provide one or more instances of a spoken utterance of the invocation phrase(s) to which the TD features are constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD machine learning model to generate a corresponding speaker embedding for each of the utterances. The speaker features can then be generated as a function of the speaker embeddings, and stored (e.g., on device) for use in TD techniques. For example, the speaker features can be a cumulative speaker embedding that is a function of (e.g., an average of) the speaker embeddings. Text-independent (TI) techniques have also been proposed for utilization in addition to or instead of TD techniques. TI features are not constrained to a subset of phrase(s) as is in TD. Like TD, TI can also utilize speaker features for a user and can generate those based on user utterances obtained through an enrollment procedure and/or other spoken interactions, although many more instances of user utterances may be required for generating useful TI speaker features.

After the speaker features are generated, the speaker features can be used in identifying the user that spoke a spoken utterance. For example, when another spoken utterance is spoken by the user, audio data that captures the spoken utterance can be processed to generate utterance features, those utterance features compared to the speaker features, and, based on the comparison, a profile can be identified that is associated with the speaker features. As one particular example, the audio data can be processed, using the speaker recognition model, to generate an utterance embedding, and that utterance embedding compared with the previously generated speaker embedding for the user in identifying a profile of the user. For instance, if a distance metric between the generated utterance embedding and the speaker embedding for the user satisfies a threshold, the user can be identified as the user that spoke the spoken utterance.

Each of the assistant input devices 105 and/or 115 and/or any other computing device(s) operating one or more of the cloud-based automated assistant components 120 may include one or more memories for storage of data and software applications, one or more processors for accessing data and executing applications, and other components that facilitate communication over a network. The operations performed by one or more of the assistant input devices 105 and/or 115 and/or by the automated assistant may be distributed across multiple computer systems. The automated assistant may be implemented as, for example, computer programs running on one or more computers in one or more locations that are coupled to each other through a network (e.g., the network(s) 110 of FIG. 1).

As noted above, in various implementations, each of the assistant input devices 105 and/or 115 may operate a respective automated assistant client 108 and/or 118. In various embodiments, each automated assistant client may include a respective speech capture/text-to-speech (TTS)/speech-to-text (STT) module 104 and/or 114 (also referred to herein simply as "speech capture/TTS/STT module"). In other implementations, one or more aspects of the respective speech capture/TTS/STT module 104 and/or 114 may be implemented separately from the respective automated assistant client 108 and/or 118 (e.g., by one or more of the cloud-based automated assistant components 120).

Each respective speech capture/TTS/STT module 104 and/or 114 may be configured to perform one or more functions including, for example: capture a user's speech (speech capture, e.g., via respective microphone(s) 101 and/or 111); convert that captured audio to text and/or to other representations or embeddings (STT) using speech recognition model(s) stored in a database; and/or convert text to speech (TTS) using speech synthesis model(s) stored in a database. Instance(s) of these model(s) may be stored locally at each of the respective assistant input devices 105 and/or 115 and/or accessible by the assistant input devices (e.g., over the network(s) 110 of FIG. 1). In some implementations, because one or more of the assistant input devices 106 may be relatively constrained in terms of computing resources (e.g., processor cycles, memory, battery, etc.), the respective speech capture/TTS/STT module 104 and/or 114 that is local to each of the assistant input devices 105 and/or 115 may be configured to convert a finite number of different spoken phrases to text (or to other forms, such as lower dimensionality embeddings) using the speech recognition model(s). Other speech input may be sent to one or more of the cloud-based automated assistant components 120, which may include a cloud-based TTS module 116 and/or a cloud-based STT module 117.

Cloud-based STT module 117 may be configured to leverage the virtually limitless resources of the cloud to convert audio data captured by the speech capture/TTS/STT module 104 and/or 114 into text (which may then be provided to natural language processing (NLP) module 122) using speech recognition model(s). Cloud-based TTS module 116 may be configured to leverage the virtually limitless resources of the cloud to convert textual data (e.g., text formulated by automated assistant) into computer-generated speech output using speech synthesis model(s). In some implementations, the cloud-based TTS module 116 may provide the computer-generated speech output to one or more of the assistant devices 106 to be output directly, e.g., using respective speaker(s) 108 of the respective assistant devices. In other implementations, textual data (e.g., a client device notification included in a command) generated by the automated assistant using the cloud-based TTS module 116 may be provided to speech capture/TTS/STT module 104 and/or 114 of the respective assistant devices, which may then locally convert the textual data into computer-generated speech using the speech synthesis model(s), and cause the computer-generated speech to be rendered via local speaker(s) 108 and/or 118 of the respective assistant devices.

The NLP module 122 processes natural language input generated by users via the assistant input devices and may generate annotated output for use by one or more other components of the automated assistant, the assistant input devices. For example, the NLP module 122 may process natural language free-form input that is generated by a user via one or more respective user interface input devices of the assistant input device 105. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock"

being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

Assistant input device 105 is paired with headphone 100 and assistant input device 115 is paired with headphone 110. In some implementations, the pairing can be a wired connection between the headphone and the device. In some implementations, the pairing can be a wireless pairing between the headphone and respective assistant input device, such as via a Wifi and/or Bluetooth connection. Each of the headphones 100 and 110 include one or more speakers 101 and 111 and optionally, can include one or more microphones 101 and 111. Thus, in some implementations, a user can provide a spoken utterance via one or more microphones that are a component of the assistant input device 105 and 115 (i.e., microphone 109 and 119, respectively) and/or a user can provide a spoken utterance via the microphone(s) that are components of the headphone(s) 100 and 110.

The headphones 100 and 110 can be any personal device that the user can place on or near one or more of the user's ears such that audio data that is provided via the speakers 108 and 118 can be heard by the user and not by others in the vicinity of the user. Also, for example, in some implementations, the headphones may utilize one or more other techniques for conveying audio data to the user without providing the audio data to others in the vicinity of the user, such as via sound conduction. Thus, the speakers 108 and 118 can instead be one or more components that generate waves via sound conduction and convey the waves to the user such that the user perceives the waves as audio that is rendered by one or more components of the assistant input devices 105 and 115.

In some implementations, automated assistant client 108 can render audio via speaker 108 such that only the user that has placed headphone 100 on or near the user's ear can hear the rendered audio. Likewise, in some implementations, automated assistant client 108 can process audio data that is captured by microphone 101 and/or 109, determine a response to a request included in the audio data, and provide a response via the speakers 108. Similarly, a user of assistant input device 115 can provide a request via audio data that is captured by microphone 11 and/or microphone 119, automated assistant client 118 can process the audio data, and generate a response that can be rendered to the user via speaker 118. As an example, a user of headphone 100 can utter an invocation phrase of "OK Assistant," followed by a request of "What is the weather today." In response, automated assistant client 108 can process the request, and provide, via speaker(s) 108, a response of "the weather is 75 and sunny today."

In some implementations, the user of assistant input device 105 and the user of assistant input device 115 can be colocated, either physically or virtually in a virtual space. In instances where the users of the devices 105 and 115 have indicated an interest in sharing a group automated assistant session (e.g., selected a "group session" mode, affirmatively responded to a prompt to be paired with another user), the users can be paired to start a group automated assistant session. Initiating a group automated assistant session includes selecting an automated assistant to process requests that are directed to the group and causing responses to be rendered by each of the devices that are part of the group session. For example, in a group session that includes assistant input device 105 and assistant input device 115, a user can utter an utterance via microphone 111 that can be processed by one of the automated assistants that is executing on a device that is part of the group session (e.g., automated assistant client 108). The utterance can include, for example, an invocation that indicates that the request is intended for the group rather than just for the user of assistant input device 115 (e.g., "OK Group Assistant" as an invocation phrase). In response, automated assistant client 108 can process the request and cause an audio response to be rendered by both speaker(s) 108 and speaker(s) 118, thus providing the response to all users that are a part of the group session.

In some implementations, a group session can be initiated based on multiple microphones, associated with separate devices, capturing the same invocation phrase. For example, a user can utter an invocation phrase, such as "OK Assistant," that is captured by both microphone 101 and microphone 111. In response, automated assistant client 108 and/or automated assistant client 118 can determine that the users are colocated (e.g., both located within a distance from the user that uttered the invocation phrase) and further select one of the automated assistant clients as the group session automated assistant client to handle group session requests while the session is active. In some implementations, capturing audio of a user uttering an invocation phrase can be combined with one or more other actions to initiate the group session, such as the users both performing an action concurrently with the invocation phrase being uttered (e.g., each selecting a button on their respective devices, selecting a confirmation to be paired).

Figure 2:
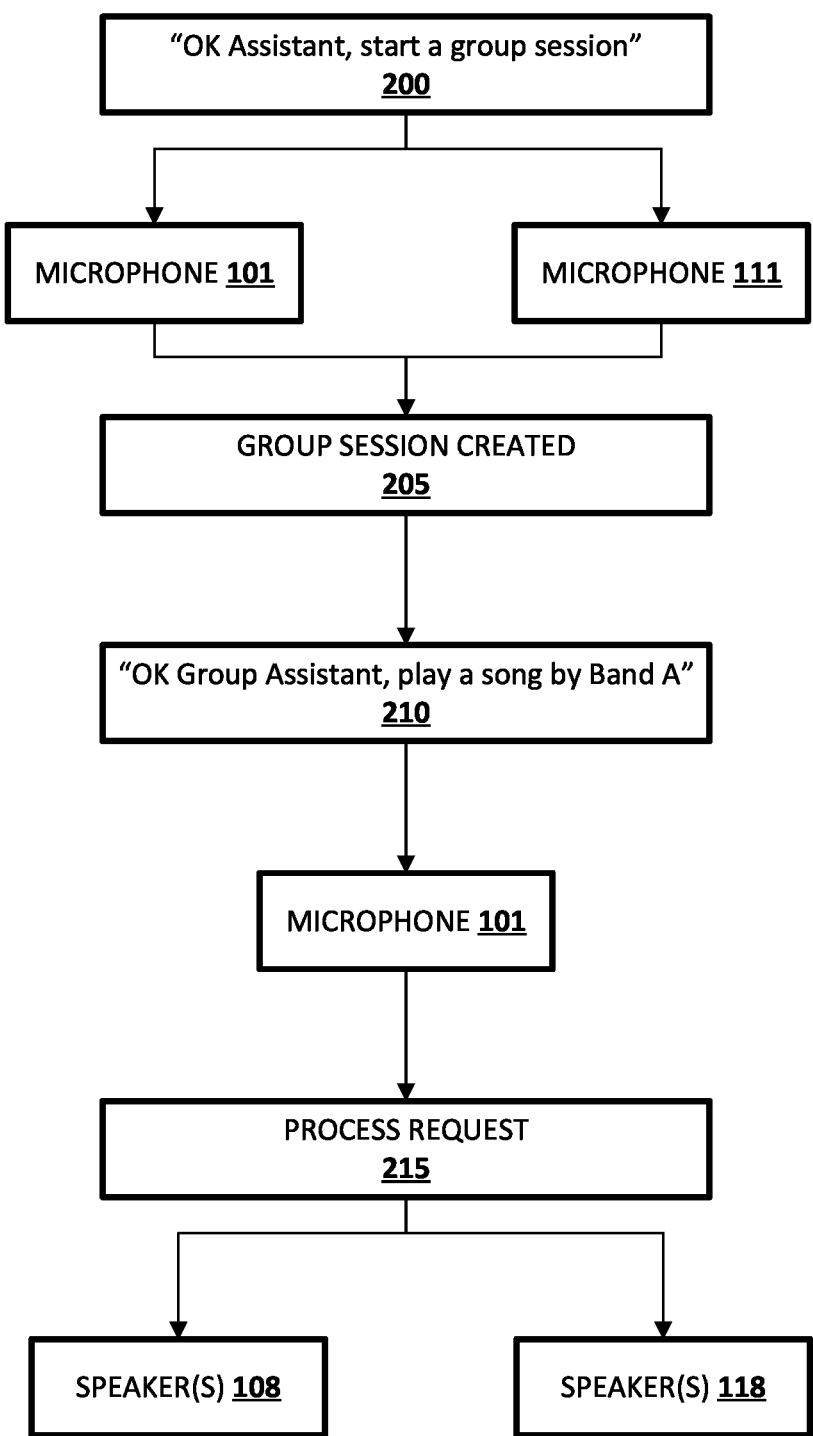
FIG. 2 is a flowchart of an example implementation of creating a group automated assistant session.

As an example, referring to FIG. 2, a user can utter the phrase "OK Assistant, start a group session," which is audible to both microphone 101 and microphone 111. In response, a group session 205 is created, which includes selecting one of the automated assistants of the devices that are associated with microphone 101 and 111 as the primary group assistant for the group session. Once the group is created the group automated assistant can process subsequent requests. For example, a user of assistant input device 105 can utter the phrase 210 (i.e., OK Group assistant, play a song by Band A"), which can be captured by microphone 101 and processed 215 by the group assistant. In response, music can be rendered by both speaker 108 and speaker 118 as a group response to the request.

In some implementations, contact information of the user(s) that are colocated can be utilized to determine whether the user(s) intend to be associated with a group session and/or whether to initiate a group session. For example, if two users have been associated with a group session a threshold number of times in the past, users that have been colocated a threshold number of times, and/or users that have previously exchanged contact information may be utilized as signals that determine whether the users are to be associated with a group session. For example, microphone 101 and microphone 111 may both capture audio data that includes a user uttering "OK Assistant" or another invocation phrase. If the users have previously stored the contact information of the other user, the users may be more likely to intend to initiate a group session and a group session may be more likely to be initiated than two users that have not shared contact information.

In some implementations, users may share a common indication that a meeting is intended for the current time. For example, assistant input device 105 and assistant input device 115 can both include a calendar application, each of which has a meeting scheduled for the current time. When the users are determined to be colocated, the group session can be initiated at the time that is indicated by the meeting entries in the calendar applications of the users.

Once a group session has been initiated, the automated assistants that are executing on each device can determine which automated assistant should process audio data associated with the group. In some implementations, all of the assistant input devices that are associated with a group session can be executing instances of the same automated assistant. In that instance, any of the automated assistant can be selected as the group session automated assistant and/or other factors can be utilized to determine which automated assistant to select (e.g., the automated assistant instance of the first user to join the group session, the automated assistant instance that is executing on the device with hardware specifications that indicate it would be better suited to handle requests, the automated assistant that is executing on the user device with longest likely battery life). Alternatively, a new instance of the automated assistant can be initiated to handle only the group session requests.

In some implementations, the devices may be executing different automated assistants and suitability to handle requests can be determined by the users and/or by which automated assistant will likely be of best use for the group, such as selecting the automated assistant that is considered less casual may be selected over a more casual automated assistant. For example, a group session that is associated with a social event may be best suited for a "casual" automated assistant that can play games and/or tell jokes, whereas a more "formal" automated assistant can be selected for a group session that is a work meeting.

In some implementations, one or more of the non-selected automated assistants can provide information related to a group session that is already in session and/or information related to previous requests of users of a group session to a selected automated assistant. For example, in some implementations, automated assistant client 108 may be selected as the automated assistant for a group session that includes other devices (not shown). When assistant input device 115 joins the group session, the selected automated assistant for the group session may switch to automated assistant client 118. In this instance, automated assistant client 108 may provide automated assistant client 118 with information related to interactions that occurred in the group session before automated assistant client 118 was selected to allow for continuity in the group session interactions.

In some implementations, once an automated assistant has been selected for handling group session requests, whether a request is directed to the group or to an individual can be determined based on the request being preceded and/or followed by a different invocation request than one or more of the invocation requests that invoke other automated assistants executing on the devices of the group session. For example, automated assistant client 108 may be selected as the group session automated assistant and may be invoked with an invocation phrase of "OK Assistant." If a user has a request that is to be associated with the group session (e.g., "play a song from Band A"), the user may utter a different invocation phrase, such as "OK Group Assistant," and/or otherwise include one or more phrases with the request (e.g., "play a song from Band A for the group"). Thus, the user of the assistant input device 105 can invoke the automated assistant for a personal request using one phrase and provide a request that affects the devices of the group session using a different phrase to differentiate the two types of requests. Also, for example, a user can follow up a query with an indication that a previously submitted personal query was intended for the group (e.g., a first request followed by "OK Assistant, that was meant for the group").

As an example, a user can utter a request that is directed to the group by uttering an invocation phrase that indicates that it is a group request (e.g., "OK Group Assistant") and/or one or more types of requests can be automatically provided to the group, such as a request to play music or send a reminder. This could include, for example, a request of "Play a song by Band A" and/or "play us some music" to indicate that the users in the group should each be provided with the same audio via their respective headphone speakers. In response, the automated assistant that has been selected as the group automated assistant (e.g., automated assistant client 108) can fulfill the request by providing fulfillment data to a music application executing on the device and further provide the other automated assistants of the group (e.g., automated assistant client 118) with fulfillment data so the other automated assistant(s) can either fulfill the request or provide fulfillment data to one or more applications executing on the respective devices.

As another example, the user of assistant input device 105 may intend to send a message to the user of assistant input device 115. The sending user can utter a request, such as "send a message to Bob," followed by uttering the message. In response, automated assistant client 108 can provide fulfillment data that includes the message to automated assistant client 118, which can provide the message to the user of that device (i.e., "Bob"). The message can be, for example, a text message sent to the device and displayed via an interface of assistant input device 115 and/or automated assistant client 118 can generate an audio response to provide via speaker 118.

As another example, audio data from the group session can be recorded and provided to one or more other devices as a message. For example, one or more users of the group can indicate that recording should start, wherein the recording includes audio data captured by microphones 101 and 111. When another request is uttered that indicates the recording should end and be sent, the audio data of the recording can be provided to the intended recipient, either as a text transcript or as audio data.

In some implementations, one or more users can leave a group that has been created by changing position to a location that is a threshold distance from the other members of the group. For example, three users can be located within a threshold distance of each other and a group session can be created, as previously described. While the three users are within the threshold distance, group level requests can be provided by any of the users and group level responses can be provided by the automated assistant that is selected as the group automated assistant. Subsequently, one of the users can change position to a location that is outside of the threshold distance. Once the user has changed position, the automated assistant that is executing on the device of the user that changed positions can take over processing requests that are provided by that user and the group automated assistant can no longer cause group content to be rendered to that user.

If the group automated assistant was the automated assistant executing on the device of the user that changes position to a location that is outside a threshold distance, a different automated assistant can be selected from the devices that remain in the group. For example, if the automated assistant of the device of User 3 has been selected as the group automated assistant, and User 3 moves away from User 1 and User 2, the automated assistant of the device of User 1 or User 2 can be selected as the group automated assistant. In some implementations, this can include the automated assistant of User 3 (i.e., the previous group automated assistant) to provide context to another automated assistant (e.g., the automated assistant of User 2) to allow for continuity in the group session. Context can include, for example, information related to previously submitted group requests and/or responses, audio data of the previous group session, and/or other actions that were performed by the group automated assistant and/or the users during the session.

In some implementations, a user can disconnect from a group session and remain within a threshold distance of other users. For example, a user may no longer intend to interact with a group while still being colocated with the other users of the group. The user that no longer intends to be a part of the group can select one or more options on their respective device, utter a request to leave the group, and/or otherwise indicate an intention to leave the group. In some implementations, a user can change position to a new location that is within a threshold distance to another group. In that instance, the user that has relocated can automatically (or be prompted) to join the nearest group while also leaving the previous group.

In some implementations, a user can make an explicit request to leave a group session and/or join another group session. For example, in some implementations, groups may be labeled such that each group has a name that can be utilized by users to join and/or leave the group, such as "OK Group Assistant, join the yellow group" or "OK Group Assistant, leave this group when the song ends." In some implementations, a group can automatically end at a particular time (e.g., when a calendar entry associated with the group expires) and/or at a time specified by one of the group members. Also, for example, a group session can end when all users of the group have indicated an intent to leave the group and/or after all users have left the group.

Figure 3A:
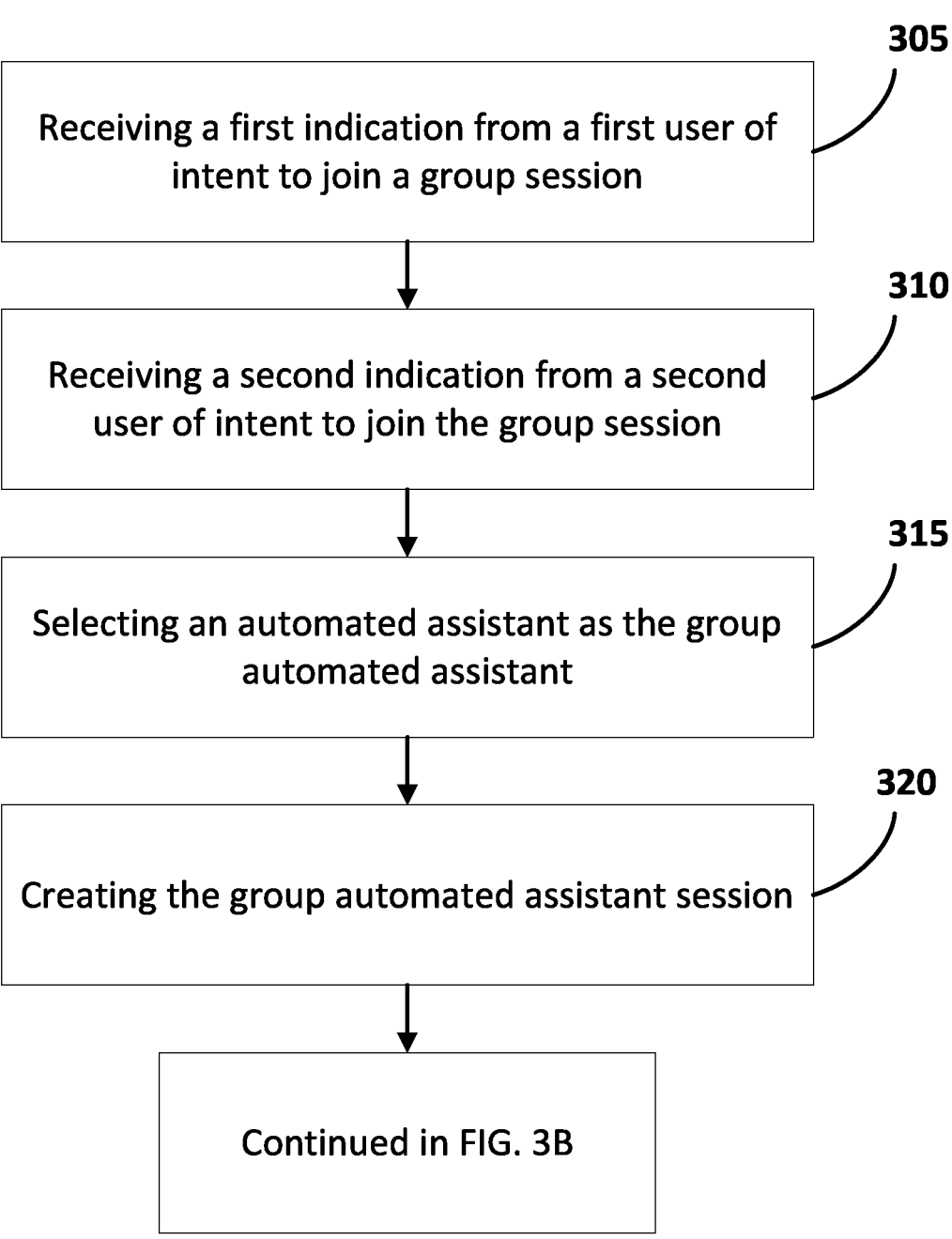
FIG. 3A and FIG. 3B is a flowchart illustrating an example method according to various implementations disclosed herein.
Figure 3B:
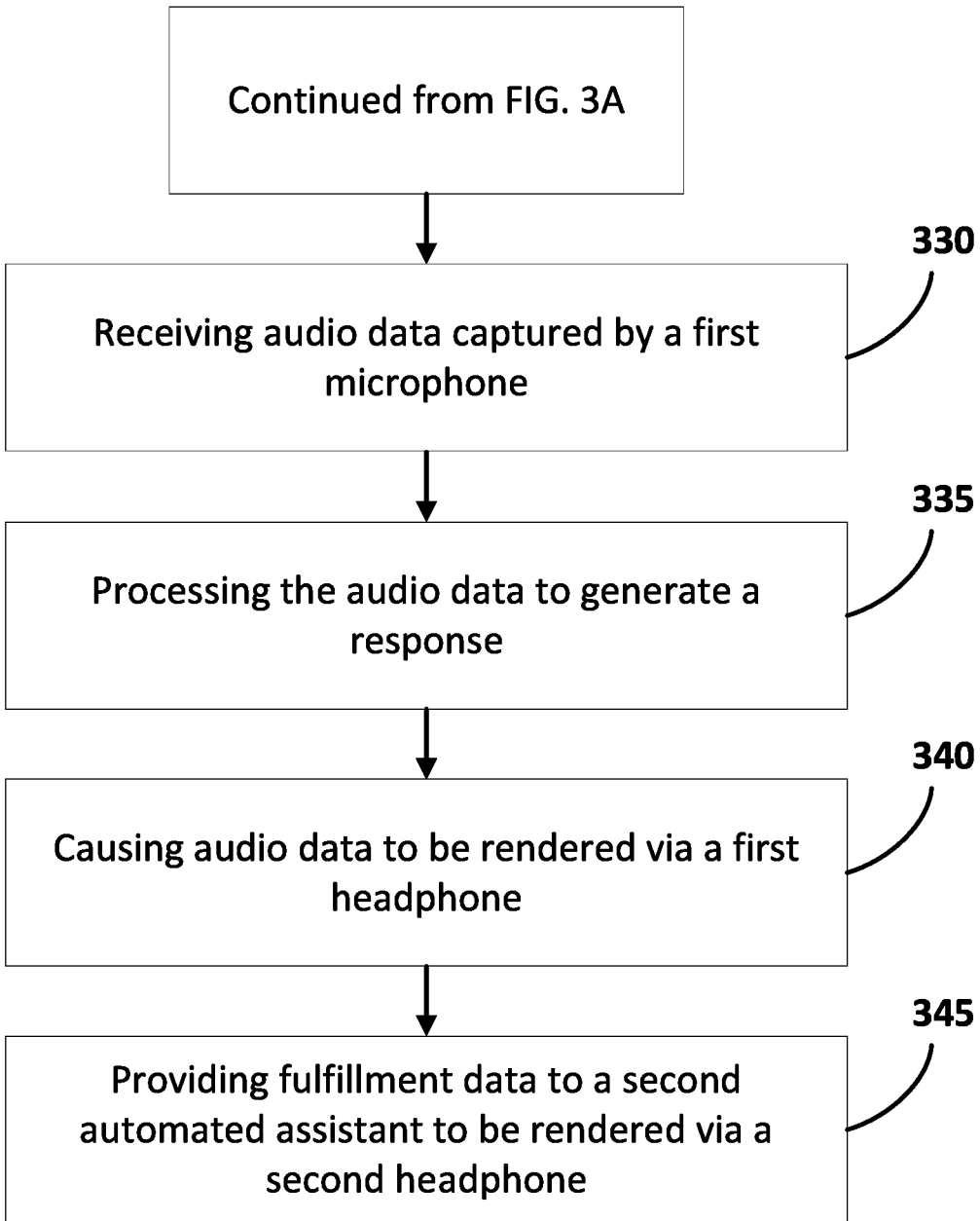

Referring to FIGS. 3A and 3B, a flowchart of an example method for creating a group automated assistant session and processing requests is illustrated. For convenience, the operations of the method are described with reference to a system that performs the operations. This system can include one or more processors and/or other component(s) of a client device. Moreover, while operations of the method are shown in a particular order, this is not meant to be limiting. One or more operations may be reordered, omitted, or added.

At step 305, a first indication is received from a first user. The first indication can be received from one or more components of assistant input device 105. For example, the indication can include the user of assistant input device 105 selecting a group session mode via one or more interfaces, pressing a button of the assistant input device 105 and/or headphone 100, and/or one or more other actions that indicate the user has interest in joining a group session. In some implementations, the indication may be identified from one or more other applications that are executing on the assistant input device 105, such as a messaging application and/or a calendar application. For example, a user may message one or more other users "Let's join a group session" and/or a calendar entry in a calendar application may indicate that the user intends to join a group session at a particular time.

At step 310, a second indication is received from a second user. The second indication can be received from one or more components of assistant input device 115. In some implementations, the second indication can share one or more characteristics with the first indication. Further, in some implementations, one or more of the first and second indications can include an indication that the first user and the second user are within a threshold distance.

At step 315, an automated assistant is selected as the primary assistant for a group automated assistant session. In some implementations, automated assistant client 108 and automated assistant client 118 may each by instances of the same automated assistant, such as an automated assistant that is executing in part on the respective devices and in part utilizing cloud-based components 120. In those instances, a new instance of the automated assistant can be created to handle group requests. In some implementations, the assistant input devices 105 and 115 may each be executing separate automated assistants and one of the automated assistants can be selected as the primary automated assistant. Selecting a primary automated assistant can include, for example, determining which automated assistant is more capable of handling group requests, which automated assistant is most appropriate for the type of group (e.g., a more "formal" automated assistant versus a more "casual" automated assistant), and/or other criteria that can be utilized to determine which automated assistant is selected as the primary automated assistant for the group automated assistant session. Also, for example, an automated assistant can be created and/or otherwise generated based on parameters that indicate preferences of the users of the group (e.g., users have indicated a preference for a particular automated assistant, an automated assistant that has particular capabilities, an automated assistant with particular traits, such as a "formal" or "casual" automated assistant).

At step 320, a group automated assistant session is created. Once created, group requests are processed by the primary automated assistant for the group session. In some implementations, a user can specify that a request is a group request, such as by uttering a group invocation phrase (e.g., "OK Group Assistant"). In some implementations, other requests that are provided by a user can be processed by the automated assistant that is executing on that user's client device. For example, a user can utter a group request of "OK Group Assistant, play us some music," which can be processed by the primary automated assistant for the group session, and further utter a request of "OK My Assistant, what's the weather today" to indicate that the request is not a group request and should be processed as if the user were not part of the group.

At step 330, audio data is received by a first microphone. In some implementations, the microphone can be a component of the assistant input device of a user, such as microphone 109 and/or microphone 119. In some implementations, the microphone can be a component of the headphone of a user that is paired with the assistant input device of the user, such as microphone 101 and/or microphone 11. In some implementations, the audio data can be captured by a microphone of the device that is executing the primary automated assistant for the group session. For example, a user can utter the phrase "OK Group Assistant, play us some music," which can be captured by microphone 101. In this instance, the audio data can be provided to the automated assistant client 108 if it is the primary automated assistant for the group session. Otherwise, for example, the audio data can be provided to automated assistant client 118 for processing.

At step 335, the audio data is processed to determine whether the audio data includes a group request and, if so, the group request is processed to generate a response. In some implementations, processing of the audio data can include performing one or more actions, such as STT, natural language processing, and/or other semantic processing to determine an intent of the user that uttered the phrase. In some implementations, one or more cloud-based components can be further utilized to process the audio data, such as cloud-based assistant components 120.

In some implementations, a particular phrase can indicate that the utterance includes a group request. For example, a user can utter the invocation phrase "OK Group Assistant" when providing a request that is for the group session and another invocation phrase, such as "OK My Assistant" when the request is not meant for the group. In some implementations, the processing is performed by the automated assistant that has been selected as the primary automated assistant for the group session. For example, if automated assistant client 108 was selected as the primary automated assistant for the group, audio data of all requests that are for the group (e.g., audio data that includes an indication that the request is meant for the group) can be provided to automated assistant client 108, including audio data that was captured by microphones 101, 111, 109, and/or 119.

At step 340, the response is rendered as audio data via a first headphone associated with the first client device. Further, at step 345, fulfillment data is provided to the second automated assistant, thereby causing the second automated assistant to render audio data via a second headphone. Thus, for the device that is executing the primary automated assistant, the primary automated assistant can render the audio data, whereas, for the other devices that are a part of the group session, fulfillment data is provided to the secondary automated assistant (i.e., the automated assistants that are not the primary automated assistant for the group session), thereby causing the secondary automated assistants to render the audio response.

Figure 4:
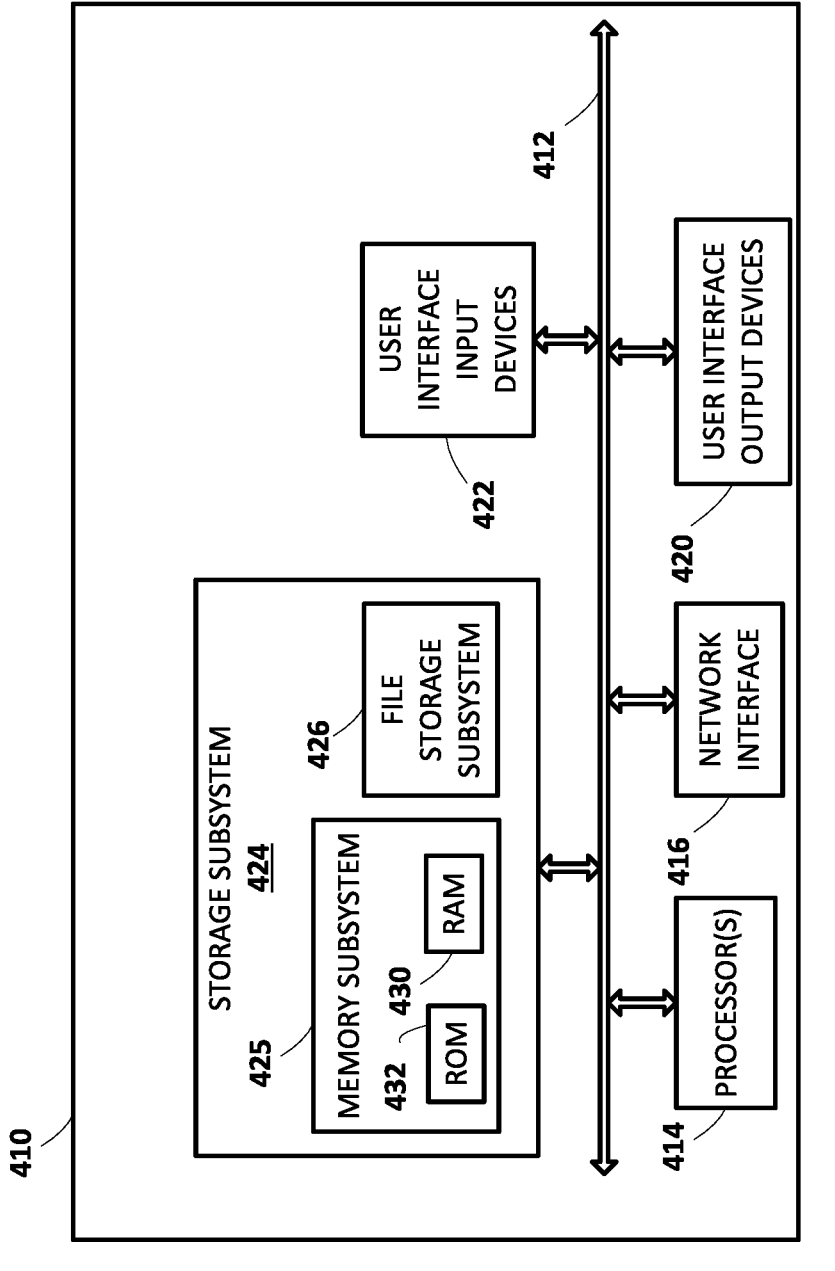
FIG. 4 illustrates an example architecture of a computing device.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods of FIG. 5 and FIG. 6, and/or to implement various components depicted in FIG. 2 and FIG. 3.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

Implementations disclosed herein include a method, comprising comprising receiving a first indication from a first user of intent to join a group automated assistant session, wherein the first indication is provided via a first client device executing a first automated assistant, and wherein the first client device is paired with a first headphone, and wherein audio responses of the first automated assistant are rendered to the first user via the first headphone, receiving a second indication from a second user of intent to join the group automated assistant session, wherein the second indication is provided via a second client device executing a second automated assistant, wherein the second client device is paired with a second headphone, and wherein audio responses of the second automated assistant are rendered to the second user via the second headphone, and selecting the first automated assistant as a primary automated assistant for the group automated assistant session. In response to receiving the first indication and the second indication, the method further includes creating the group automated assistant session, wherein while the group automated assistant session is active, the primary automated assistant is configured to receive group requests from both the first user and the second user, and cause group responses to be rendered to both the first user and the second user, receiving, by the primary automated assistant during the group automated assistant session, audio data captured by a first microphone, associated with the first client device and/or captured by a second microphone, associated with the second client device, processing, by the primary automated assistant, the audio data to determine that the audio data includes a group request, generating, by the primary automated assistant, an audio response that is responsive to the group request, causing the audio response to be rendered via the first headphone in response to the group request, and providing, to the second automated assistant, fulfillment data that causes the second automated assistant to render the audio response via the second headphone in response to the group request.

These and other implementations of the technology disclosed herein can include one or more of the following features.

In some implementations, the group automated assistant session is further created in response to the first microphone and/or the second microphone capturing audio data that includes a group invocation phrase.

In some implementations, at least one of the first indication and the second indication is an active group session mode.

In some implementations, at least one of the first indication and the second indication indicates that the first client device is within a threshold distance from the second client device.

In some implementations, the method further includes determining that the first client device and the second client device are no longer within the threshold distance, and ending the group automated assistant session.

In some implementations, the request is for audio playback, and wherein the audio response is playback of audio data to the users.

In some implementations, the method further includes receiving, by a third client device, executing a third automated assistant, a third indication from a third user of intent to join a group automated assistant session, wherein the third client device is paired with a third headphone, and wherein audio responses of the first automated assistant are rendered to the third user via the third headphone.

In some implementations, the method further includes providing, via the third headphone, a summary of one or more previous requests and/or responses of the group automated assistant session.

In some implementations, at least one of the first indication and the second indication is a calendar entry of the first user and/or the second user.

In some implementations, the method further includes receiving, by the primary automated assistant during the group automated assistant session, audio data captured by the first microphone, processing, by the primary automated assistant, the audio data to determine that the audio data includes a private request, wherein the private request is intended only for the first user, generating, by the primary automated assistant, an audio response that is responsive to the private request, and causing the audio response to be rendered via the first headphone in response to the group request without providing, to the second automated assistant, fulfillment data.

In some implementations, the first indication and the second indication are received by a third device in communication with the first client device and the second client device.

In some implementations, the first indication and the second indication are received by the first client device.

Other implementations can include a transistor or non-transitory computer readable storage medium storing instructions executable by a processor to perform a method such as one or more of the methods described above. Yet another implementation can include a control system including memory and one or more processors operable to execute instructions, stored in the memory, to implement one or more modules or engines that, alone or collectively, perform a method such as one or more of the methods described above.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method, implemented by one or more processors, comprising:

receiving a first indication from a first user of intent to join a group automated assistant session, wherein the first indication is provided via a first client device executing a first automated assistant, and wherein the first client device is paired with a first headphone, and wherein audio responses of the first automated assistant are rendered to the first user via the first headphone;

receiving a second indication from a second user of intent to join the group automated assistant session, wherein the second indication is provided via a second client device executing a second automated assistant, wherein the second client device is paired with a second headphone, and wherein audio responses of the second automated assistant are rendered to the second user via the second headphone;

selecting, when the first automated assistant is executing on the first client device and is not executing on the second client device, the first automated assistant as a primary automated assistant for the group automated assistant session;

in response to receiving the first indication, the second indication, and a group invocation phrase:

creating the group automated assistant session, wherein while the group automated assistant session is active, the primary automated assistant is configured to receive group requests from both the first user and the second user, and cause group responses to be rendered to both the first user and the second user;

receiving, by the primary automated assistant during the group automated assistant session, audio data captured by a first microphone, associated with the first client device and/or captured by a second microphone, associated with the second client device;

processing, by the primary automated assistant, the audio data to determine that the audio data includes a group request, wherein determining that the audio data processed by the primary automated assistant includes the group request comprises determining that the audio data includes the group invocation phrase;

generating, by the primary automated assistant, an audio response that is responsive to the group request;

causing the audio response to be rendered via the first headphone in response to the group request; and providing, to the second automated assistant, fulfillment data that causes the second automated assistant to render the audio response via the second headphone in response to the group request.

2. The method of claim 1, wherein the group automated assistant session is further created in response to the first microphone and/or the second microphone capturing audio data that includes a group invocation phrase.

3. The method of claim 1, wherein at least one of the first indication and the second indication is an active group session mode.

4. The method of claim 1, wherein at least one of the first indication and the second indication indicates that the first client device is within a threshold distance from the second client device.

5. The method of claim 4, further comprising:

determining that the first client device and the second client device are no longer within the threshold distance; and ending the group automated assistant session.

6. The method of claim 1, wherein the group request is for audio playback, and wherein the audio response is playback of audio data to the first user and the second user.

7. The method of claim 1, further comprising:

receiving, by a third client device, executing a third automated assistant, a third indication from a third user of intent to join a group automated assistant session, wherein the third client device is paired with a third headphone, and wherein audio responses of the third automated assistant are rendered to the third user via the third headphone.

8. The method of claim 7, further comprising:

providing, via the third headphone, a summary of one or more previous requests and/or responses of the group automated session.

9. The method of claim 1, wherein at least one of the first indication and the second indication is a calendar entry of the first user and/or the second user.

10. The method of claim 1, further comprising:

receiving, by the primary automated assistant during the group automated assistant session, audio data captured by the first microphone;

processing, by the primary automated assistant, the audio data to determine that the audio data includes a private request, wherein the private request is intended only for the first user;

generating, by the primary automated assistant, an audio response that is responsive to the private request; and causing the audio response to be rendered via the first headphone in response to the private request without providing, to the second automated assistant, fulfillment data.

11. The method of claim 1, wherein the first indication and the second indication are received by a third device in communication with the first client device and the second client device.

12. The method of claim 1, wherein the first indication and the second indication are received by the first client device.

13. A system, comprising:

a first client device, wherein the first client device is executing a first automated assistant, wherein the first client device is paired with a first headphone, and wherein audio responses of the first automated assistant are rendered to a first user via the first headphone;

a second client device, wherein the second client device is executing a second automated assistant, wherein the second client device is paired with a second headphone, and wherein audio responses of the second automated assistant are rendered to a second user via the second headphone; and a group automated assistant client, wherein the group automated assistant client is configured to:

receive a first indication from the first client device of intent to join a group automated assistant session;

receive a second indication from a second client device of intent to join the group automated assistant session;

select, when the first automated assistant is executing on the first client device and is not executing on the second client device, a primary automated assistant for the group automated assistant session; and in response to receiving the first indication, the second indication, and a group invocation phrase:

create the group automated assistant session, wherein while the group automated assistant session is active, the primary automated assistant is configured to receive group requests from both the first user and the second user, and cause group responses to be rendered to both the first user and the second user, wherein in receiving the group request, the primary automated assistant is to process audio data and determine, based on processing the audio data, that the audio data includes the group invocation phrase.

14. The system of claim 13, wherein the primary automated assistant is the first automated assistant.

15. The system of claim 13, wherein the group automated assistant client is executing on one of the first client device and/or the second client device.

16. The system of claim 13, wherein the group automated assistant client is executing on a remote device in communication with the first client device and the second client device.

17. The system of claim 13, wherein the primary automated assistant is further configured to:

receive, during the group automated assistant session, audio data captured by a first microphone, associated with the first client device and/or captured by a second microphone, associated with the second client device;

process the audio data to determine that the audio data includes a group request;

generate an audio response that is responsive to the group request;

cause the audio response to be rendered via the first headphone in response to the group request; and cause the audio response to be rendered via the second headphone in response to the group request.

18. At least one non-transitory computer-readable medium comprising instructions that, in response to execution of the instructions by one or more processors, cause the one or more processors to perform the following operations:

receiving a first indication from a first user of intent to join a group automated assistant session, wherein the first indication is provided via a first client device executing a first automated assistant, and wherein the first client device is paired with a first headphone, and wherein audio responses of the first automated assistant are rendered to the first user via the first headphone;

receiving a second indication from a second user of intent to join the group automated assistant session, wherein the second indication is provided via a second client device executing a second automated assistant, wherein the second client device is paired with a second headphone, and wherein audio responses of the second automated assistant are rendered to the second user via the second headphone;

selecting, when the first automated assistant is executing on the first client device and is not executing on the second client device, the first automated assistant as a primary automated assistant for the group automated assistant session;

in response to receiving the first indication, the second indication, and a group invocation phrase:

creating the group automated assistant session, wherein while the group automated assistant session is active, the primary automated assistant is configured to receive group requests from both the first user and the second user, and cause group responses to be rendered to both the first user and the second user;

receiving, by the primary automated assistant during the group automated assistant session, audio data captured by a first microphone, associated with the first client device and/or captured by a second microphone, associated with the second client device;

processing, by the primary automated assistant, the audio data to determine that the audio data includes a group request, wherein determining that the audio data processed by the primary automated assistant includes the group request comprises determining that the audio data includes the group invocation phrase;

generating, by the primary automated assistant, an audio response that is responsive to the group request;

causing the audio response to be rendered via the first headphone in response to the group request; and providing, to the second automated assistant, fulfillment data that causes the second automated assistant to render the audio response via the second headphone in response to the group request.

19. The at least one non-transitory computer-readable medium of claim 18, wherein the first indication and the second indication are received by a third device in communication with the first client device and the second client device.

20. The at least one non-transitory computer-readable medium of claim 18, wherein the first indication and the second indication are received by the first client device.

\* \* \* \* \*